United States Patent
Reck

(10) Patent No.: US 7,681,596 B2
(45) Date of Patent: *Mar. 23, 2010

(54) ISOLATION VALVE WITH VALVE IN DRAIN

(75) Inventor: Michael E. Reck, Worcester, MA (US)

(73) Assignee: Webstone Company, Inc., Worcester, MA (US)

( * ) Notice: Subject to any disclaimer, the term of this patent is extended or adjusted under 35 U.S.C. 154(b) by 236 days.

This patent is subject to a terminal disclaimer.

(21) Appl. No.: 10/573,094

(22) PCT Filed: Sep. 23, 2004

(86) PCT No.: PCT/US2004/031167

§ 371 (c)(1),
(2), (4) Date: Dec. 18, 2006

(87) PCT Pub. No.: WO2005/031200

PCT Pub. Date: Apr. 7, 2005

(65) Prior Publication Data

US 2007/0169827 A1     Jul. 26, 2007

Related U.S. Application Data

(63) Continuation-in-part of application No. 10/097,762, filed on Mar. 14, 2002.

(60) Provisional application No. 60/300,345, filed on Jun. 22, 2001, provisional application No. 60/300,622, filed on Jun. 25, 2001, provisional application No. 60/505,193, filed on Sep. 23, 2003.

(51) Int. Cl.
*F16K 11/22*     (2006.01)

(52) U.S. Cl. .................................. 137/883; 137/625.47

(58) Field of Classification Search ................. 137/596, 137/625.22, 625.24, 625.47, 883, 887; 251/310, 251/315.14; 122/13.01, 13.3, 14.3, 14.31; 237/8 R, 8 A, 8 D, 56

See application file for complete search history.

(56) References Cited

U.S. PATENT DOCUMENTS

| | | | |
|---|---|---|---|
| 1,350,362 A | 8/1920 | Decker | 137/596 |
| 3,473,554 A | 10/1969 | King | 137/312 |
| 3,591,131 A | 7/1971 | Carlson | 251/144 |

(Continued)

*Primary Examiner*—John Fox
(74) *Attorney, Agent, or Firm*—Seyfarth Shaw LLP; Brian L. Michaelis

(57) ABSTRACT

A fluid isolation valve having a valve body with a first fluid flow port, a second fluid flow port and a fluid drain port with a valve in the fluid drain port. The valve body also defines a fluid flow channel, a drain flow channel and a valve portion, wherein the valve portion is disposed in the valve body to be communicated with the first fluid flow port, the second fluid flow port and the fluid drain port A flow diversion device is also provided and is disposed within the valve portion. The flow diversion device is configurable between a first configuration and a second configuration, such that when the flow diversion device is in the first configuration the first fluid flow port is communicated with the second fluid flow port Consequently, when the flow diversion device is in the second configuration the first fluid flow port is communicated with the fluid drain port. The fluid flow can be decrease or stop by use of the valve within the fluid drain port.

5 Claims, 13 Drawing Sheets

U.S. PATENT DOCUMENTS

| | | |
|---|---|---|
| 3,674,052 A | 7/1972 | Hartman et al. ........ 137/625.21 |
| 3,770,016 A | 11/1973 | Johnstone et al. ...... 137/625.22 |
| 4,089,345 A | 5/1978 | Eberhardt ............... 137/596.2 |
| 4,103,868 A | 8/1978 | Thompson ................. 251/283 |
| 4,206,904 A | 6/1980 | Dante .................... 251/315.08 |
| 4,342,444 A | 8/1982 | Sonderman ............ 251/315.14 |
| 4,479,459 A | 10/1984 | Piper .......................... 122/379 |
| 4,718,444 A | 1/1988 | Boelte ......................... 137/15 |
| 5,551,479 A | 9/1996 | Graves .................... 137/614.2 |
| 5,632,300 A | 5/1997 | Isringhausen ............... 137/269 |
| 5,857,717 A | 1/1999 | Caffrey ................... 285/289.1 |
| 6,296,229 B1 | 10/2001 | Giacomini ................. 251/314 |

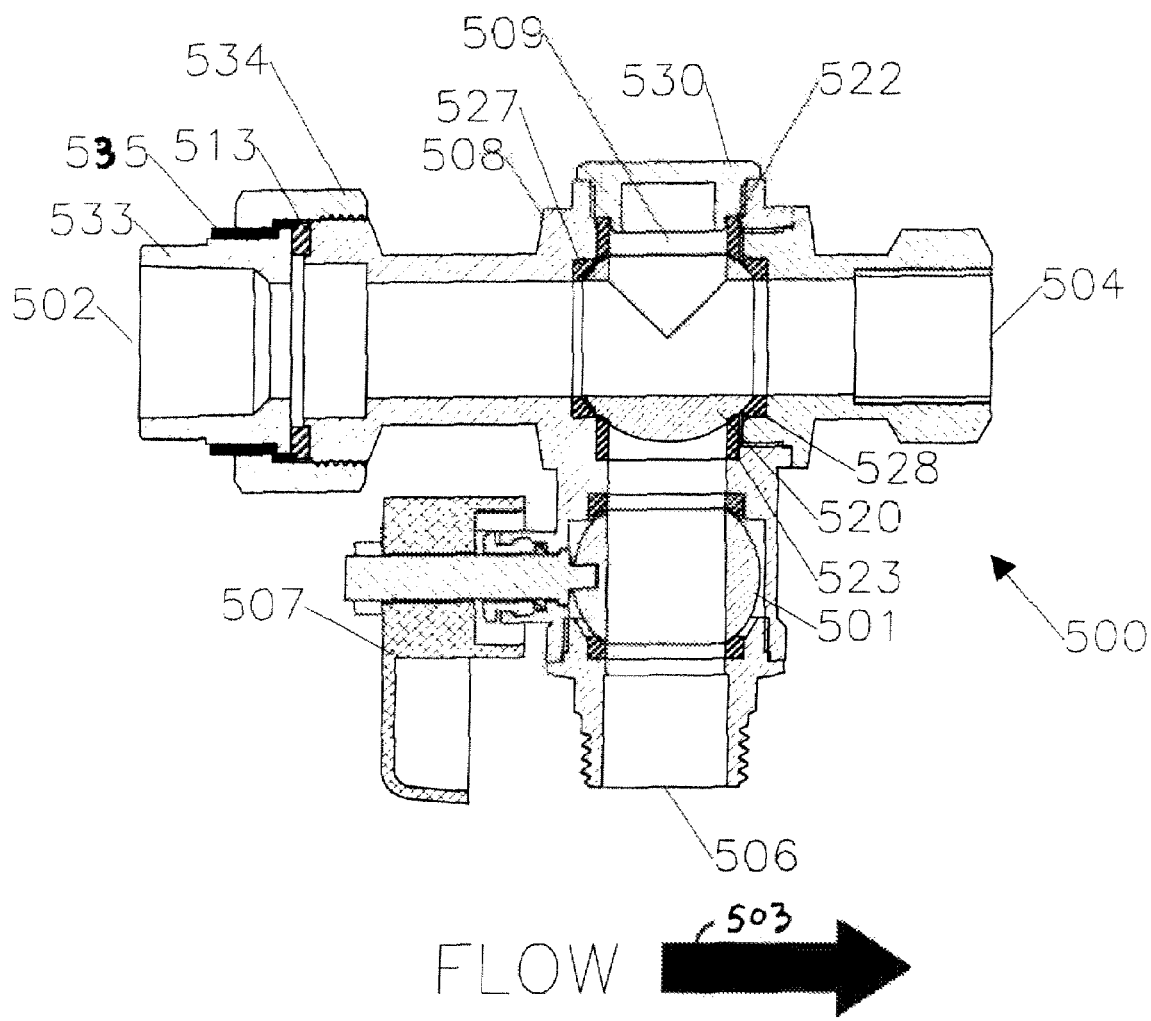
FLOW →
FIG 5A1

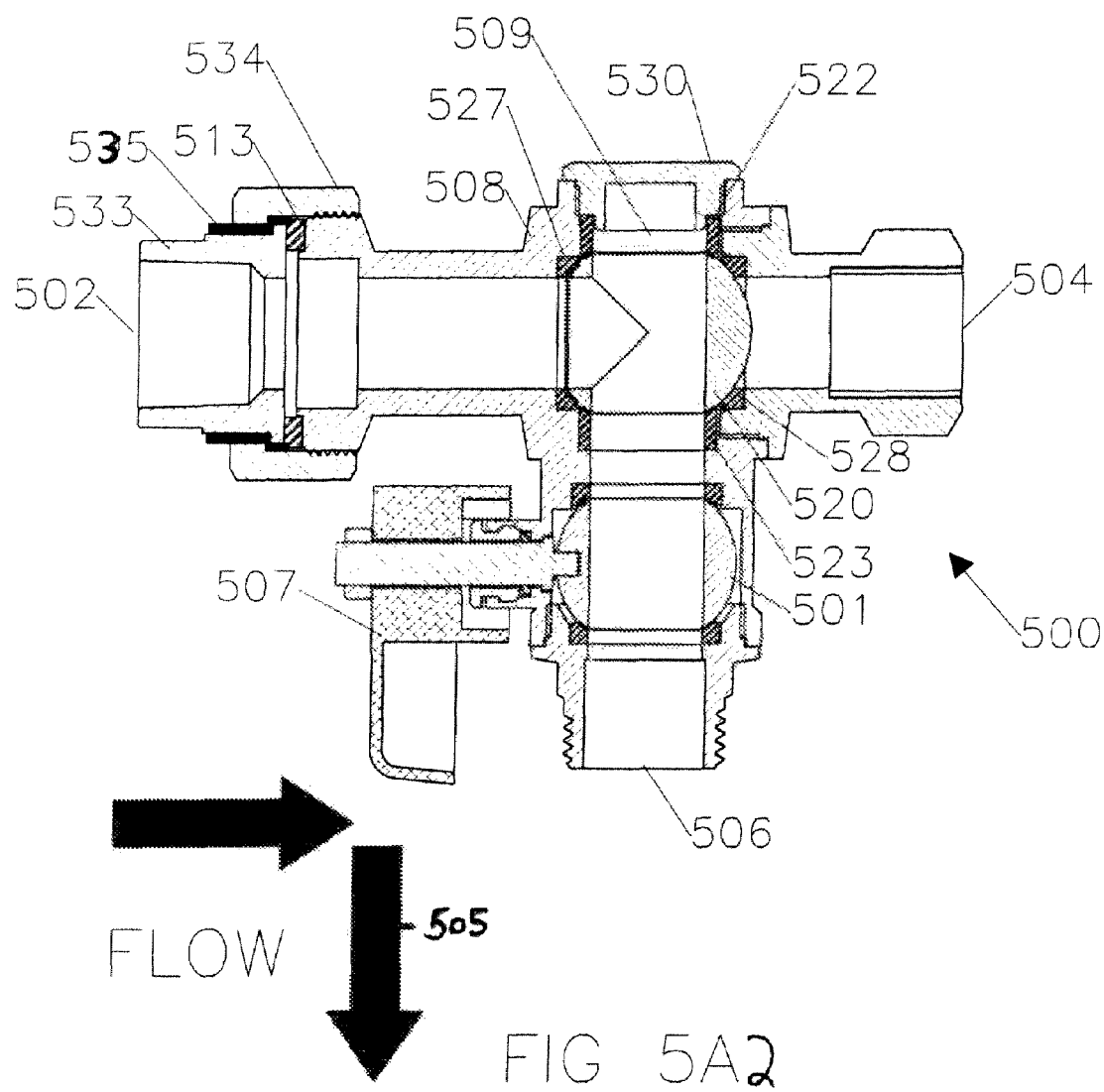
FIG 5A2

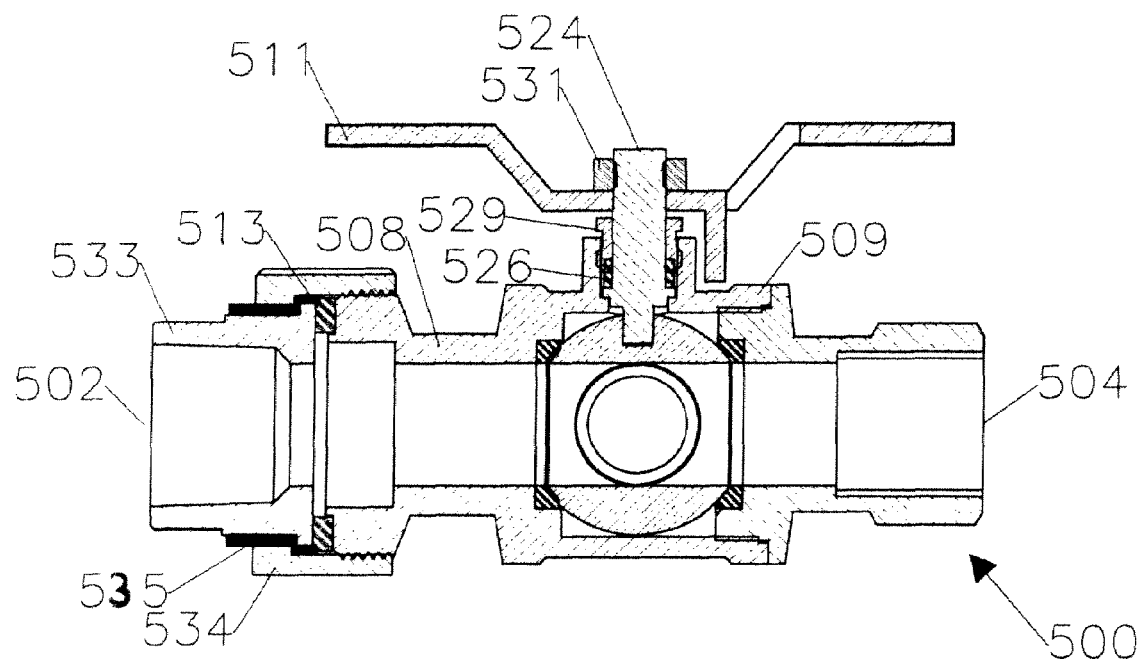
FIG 5B1

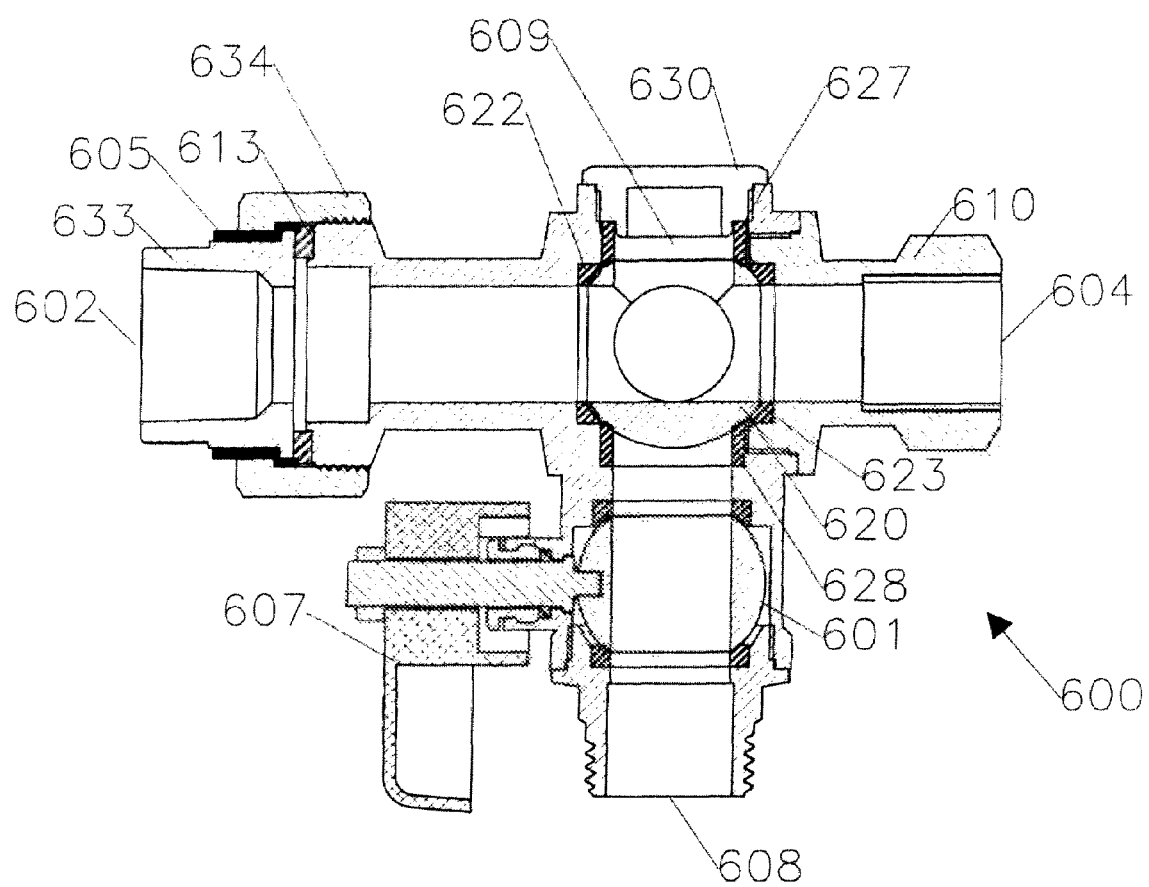
FIG 6A1

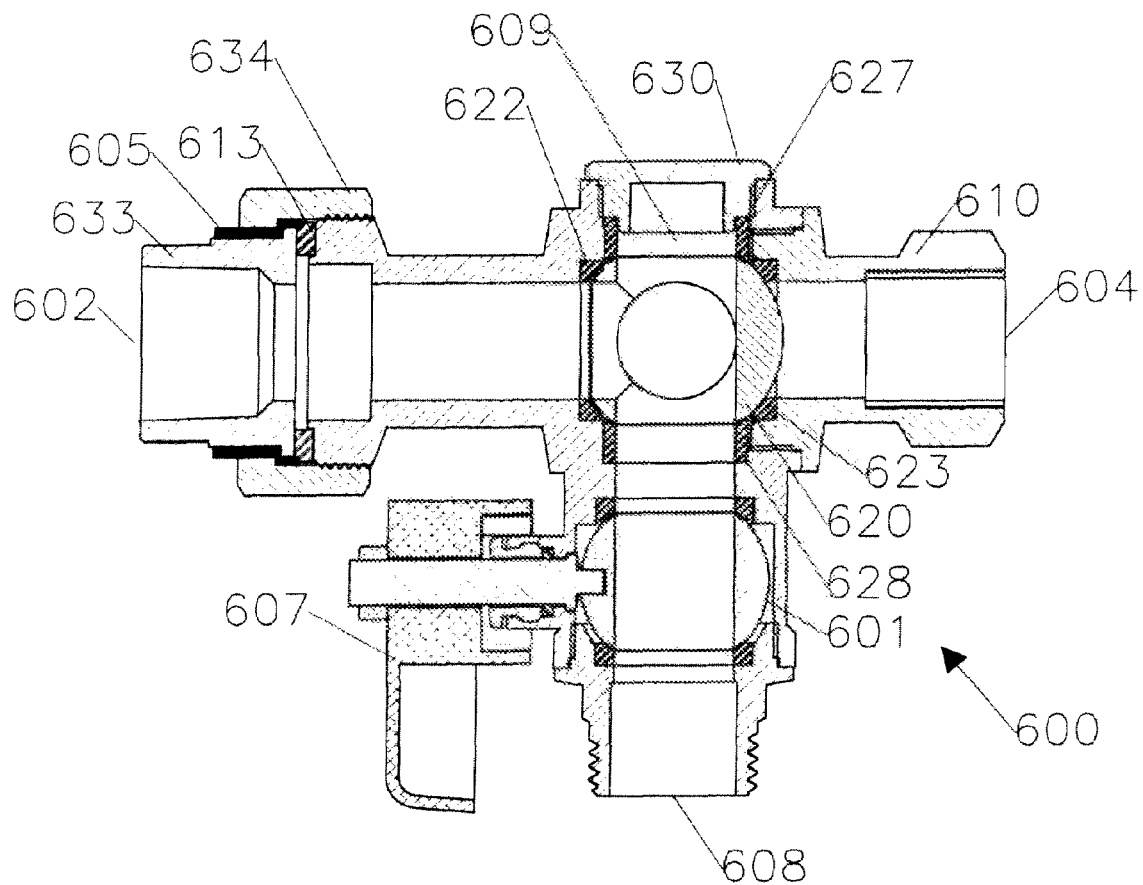
FIG 6A2

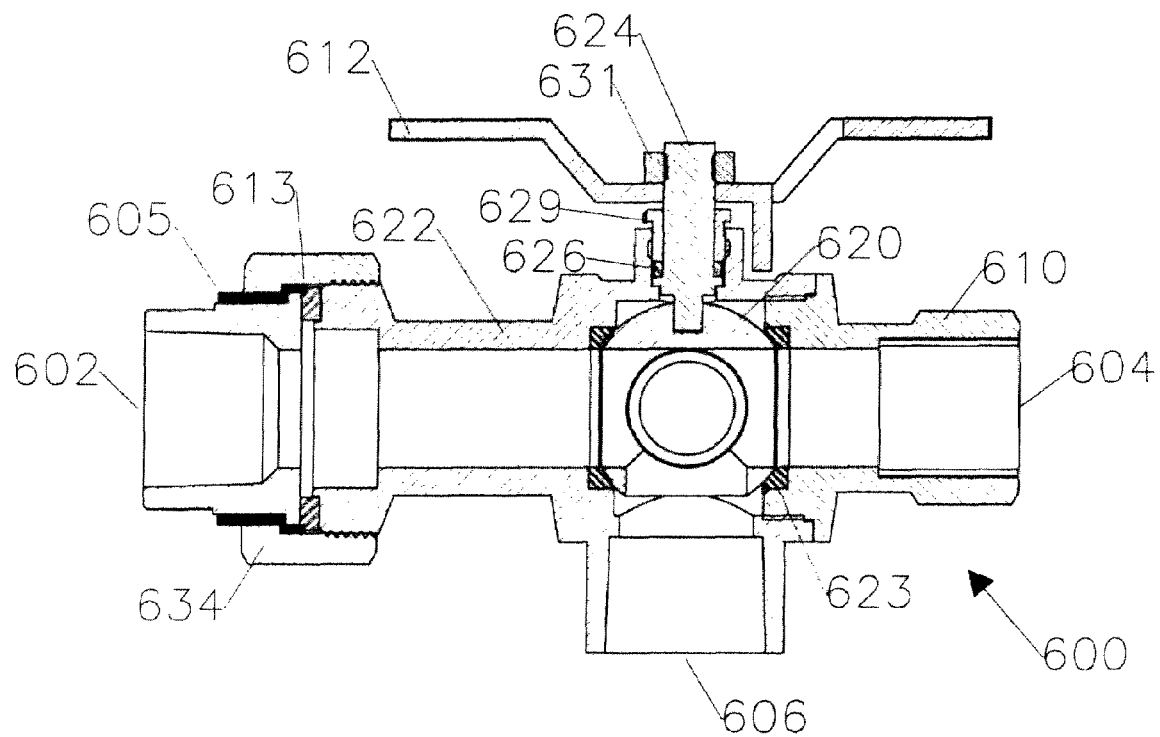
FIG 6B1

ISOLATION VALVE WITH VALVE IN DRAIN

CROSS REFERENCE TO RELATED APPLICATIONS

This Patent Application claims priority to U.S. Provisional Application Ser. No. 60/505,193, filed on Sep. 23, 2003, the contents of which are incorporated herein by reference in their entirety, and also is a Continuation-in-part of U.S. patent application Ser. No. 10/097,762 filed Mar. 14, 2002, which claims priority from U.S. Provisional Patent Application Ser. No. 60/300,345, filed on Jun. 22, 2001 and U.S. Provisional Application Ser. No. 60/300,622, filed on Jun. 25, 2001.

FIELD OF THE INVENTION

This invention relates generally to isolation valves and more particularly to isolation valves for an in-line appliance.

BACKGROUND OF THE INVENTION

Isolation valves are well known and are traditionally used in plumbing and heating applications to control the flow of water or other fluid to and from an in-line appliance or piece of equipment for purposes of maintenance, replacement or repair. Unfortunately, however, current designs are large and bulky and do not allow for a full fluid flow. This is undesirable for many reasons. In-line appliances are typically disposed in limited spaces, thus the large bulky size of current designs make them cumbersome and difficult to install in limited spaces. In some cases the limited space makes them impossible to install, remove and/or repair. Furthermore, some in-line appliances, e.g. tankless water heaters, are tested by fluid flow rates and temperature calculations. Disadvantageously, the partial fluid flow capability of current designs makes it difficult for the in-line appliance to be accurately tested.

SUMMARY OF THE INVENTION

A fluid isolation valve is provided having a valve body with a first fluid flow port, a second fluid flow port and a fluid drain port with a valve in the fluid drain port. The valve body also defines a fluid flow channel, a drain flow channel and a valve portion, wherein the valve portion is disposed in the valve body to facilitate fluid communication with the first fluid flow port, the second fluid flow port and the fluid drain port. A flow diversion device is also provided and is disposed within the valve portion. The flow diversion device flow diversion device is in the first configuration wherein the first fluid flow port is communicated with the second fluid flow port. Consequently, when the flow diversion device is in the second configuration the first fluid flow port is communicated with the fluid drain port.

Advantageously, the fluid isolation according to the invention allows testing of an installed in-line appliance and easy cleaning and flushing of any such in-line appliance.

BRIEF DESCRIPTION OF THE DRAWINGS

The foregoing and other features and advantages of the present invention will be more fully understood from the following detailed description of illustrative embodiments, taken in conjunction with the accompanying drawing in which:

FIG. 5A1 is a complete section view of the valve of FIG. 5A illustrating flow from the first port to the second port;

FIG. 5A2 is a complete section view of the valve of FIG. 5A1 illustrating flow through the drain port;

FIG. 5B1 is a complete section view of the value of FIG. 5B;

FIG. 6A1 is a complete section view of the valve of FIG. 6A illustrating flow from the first port to the second port;

FIG. 6A2 is a complete section view of the valve of FIG. 6A1 illustrating flow through the drain port;

FIG. 6B1 is a complete section view of the value of FIG. 6B;

DETAILED DESCRIPTION

Figure 1:
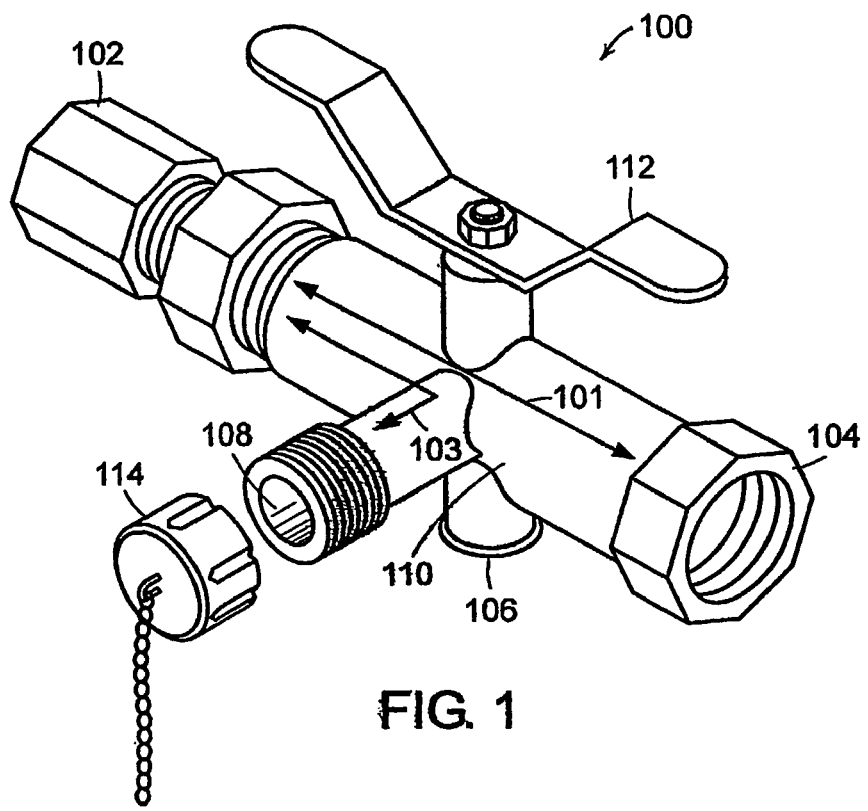
FIG. 1 is a perspective view of a first embodiment of a hot water isolation valve according to the invention in a first configuration.

Referring to FIG. 1, a hot water isolation valve 100 is shown and includes a first hot water port 102, a second hot water port 104, a hot water relief port 106 and a hot water drain port 108. Hot water isolation valve 100 defines a hot water flow channel 101 and a hot water drain channel 103. The hot water flow channel 101 provides fluid communication between the first hot water port 102 and the second hot water port 104. The hot water drain channel 103 provides fluid communication between the first hot water port 102 and the hot water drain port 108. The hot water isolation valve 100 includes a flow diversion device (not shown), such as a ball valve, disposed within a valve portion 110 disposed between first hot water port 102, second hot water port 104, hot water relief port 106 and hot water drain port 108. Moreover, the flow diversion device is configurable between a first configuration and a second configuration via a flow adjustment means 112, such as a butterfly handle.

Figure 2:
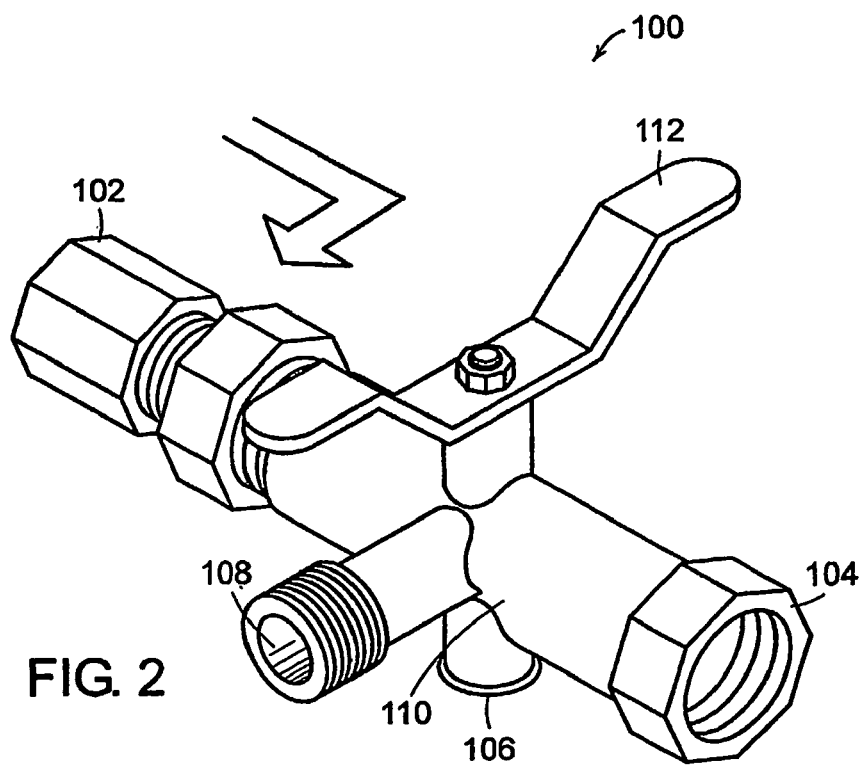
FIG. 2 is a perspective view of the hot water isolation valve of FIG. 1 in a second configuration.

In FIG. 1, the flow diversion device is shown in a first configuration wherein hot water flow is between first hot water port 102 and second hot water port 104. In FIG. 2, the flow diversion device is shown in a second configuration wherein hot water flow is between first hot water port 102 and hot water drain port 108. It should be noted that hot water relief port 106 includes a threaded portion (female) for receiving a hot water relief valve. However, although hot water relief port 106 is shown having a threaded (female) portion, it should be appreciated that hot water relief port 106 may be configured for connecting with a hot water relief valve in any manner suitable to the desired end purpose, such as a threaded portion (male), a friction fit connector, a crimped connector, a clamped connector, a quick disconnect connector, or the like.

Figure 3:
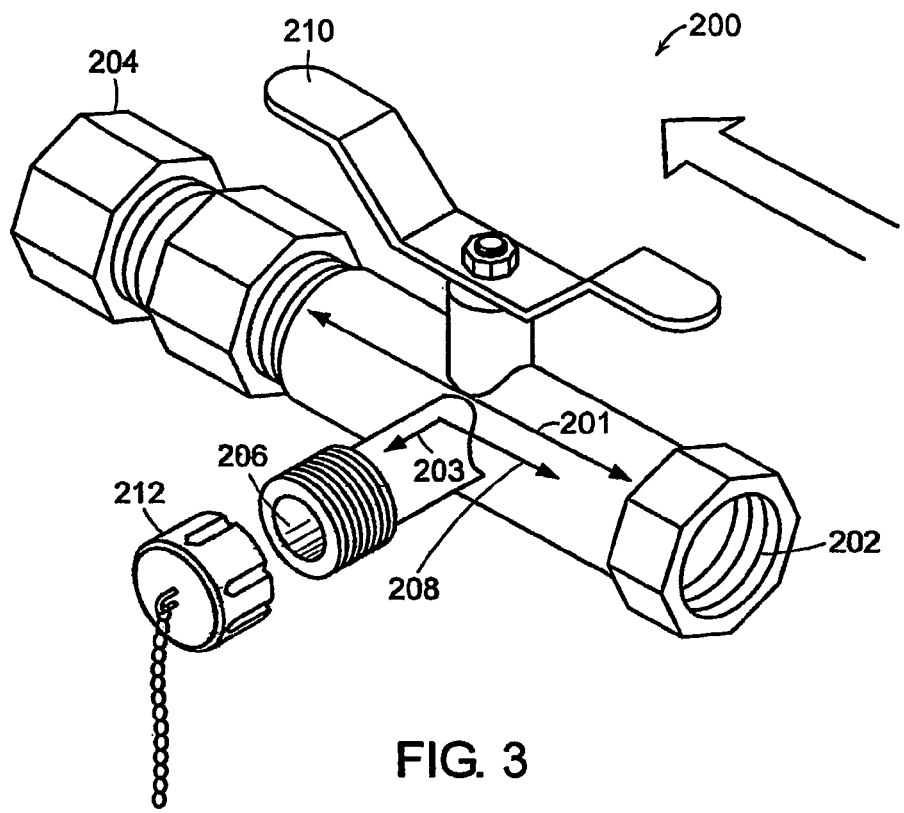
FIG. 3 is a perspective view of a second embodiment of a cold water isolation valve according to the invention in a first configuration.
Figure 4:
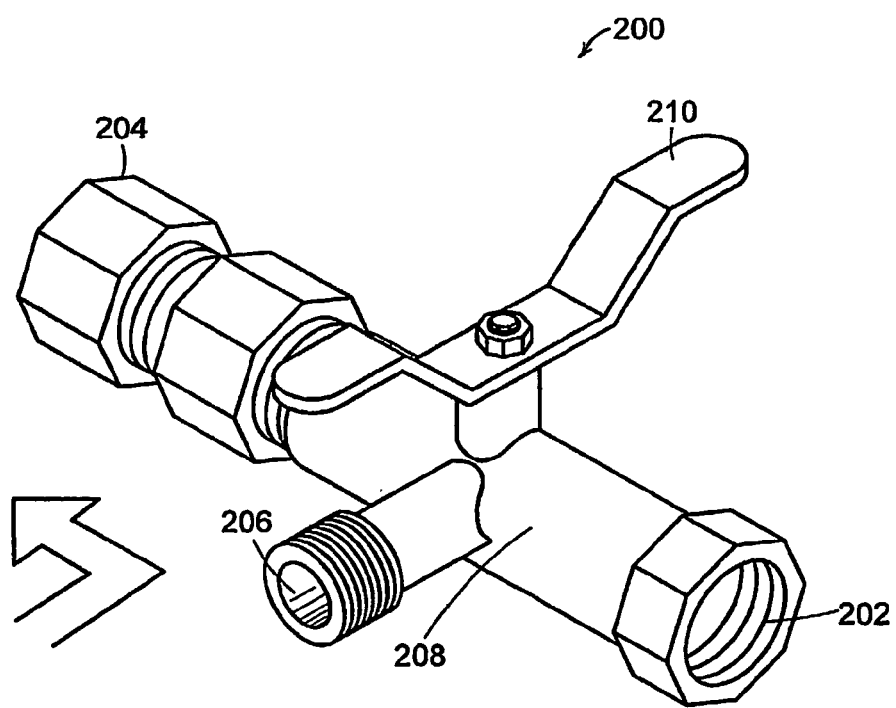
FIG. 4 is a perspective view of the cold water isolation valve of FIG. 3 in a second configuration.

Referring to FIG. 3, a cold water isolation valve 200 is shown and includes a first cold water port 202, a second cold water port 204 and a cold water drain port 206. Cold water isolation valve 200 defines a cold water flow channel 201 and a cold water drain channel 203, wherein cold water flow channel 201 is disposed to communicate first cold water-port 202 with second cold water port 204 and wherein cold water drain channel 203 is disposed to communicate first cold water port 202 with cold water drain port 206. Cold water isolation valve 200 also includes a flow diversion device, such as a ball valve, disposed-within a valve portion 208. Valve portion 208 is disposed between first cold water port 202, second cold water port 204 and cold water drain port 206. Moreover, the flow diversion device is configurable between a first configuration and a second configuration via a flow adjustment means 210. In FIG. 3, the flow diversion device is shown in a first configuration wherein cold water flow is between first cold water port 202 and second cold water port 204. In FIG. 4, the flow diversion device is shown in a second configuration wherein cold water flow is between second cold water port 204 and cold water drain port 206.

Referring to FIGS. 5A, 5A1, 5A2, 5B and 5B1, a further illustrative cold water isolation valve 500 according to the invention is shown and includes a first cold water port 502, a second cold water port 504 and a cold water drain port 506 having a drain valve 501. In this further illustrative embodiment, the drain valve 501 is a ball valve fitted with a drain valve handle 507. The drain valve handle 507 is a one leaf handle that allows actuation of the drain valve 501 in a more compact valve design. It is contemplated within the scope of the invention that the drain valve 501 can be without a handle and be actuated by a set screw, any handle configuration or the like. It is also contemplated within the scope of the invention that the drain valve 501 can be other than a ball valve such as a traditional stem and valve seat design or the like.

Figure 5A:
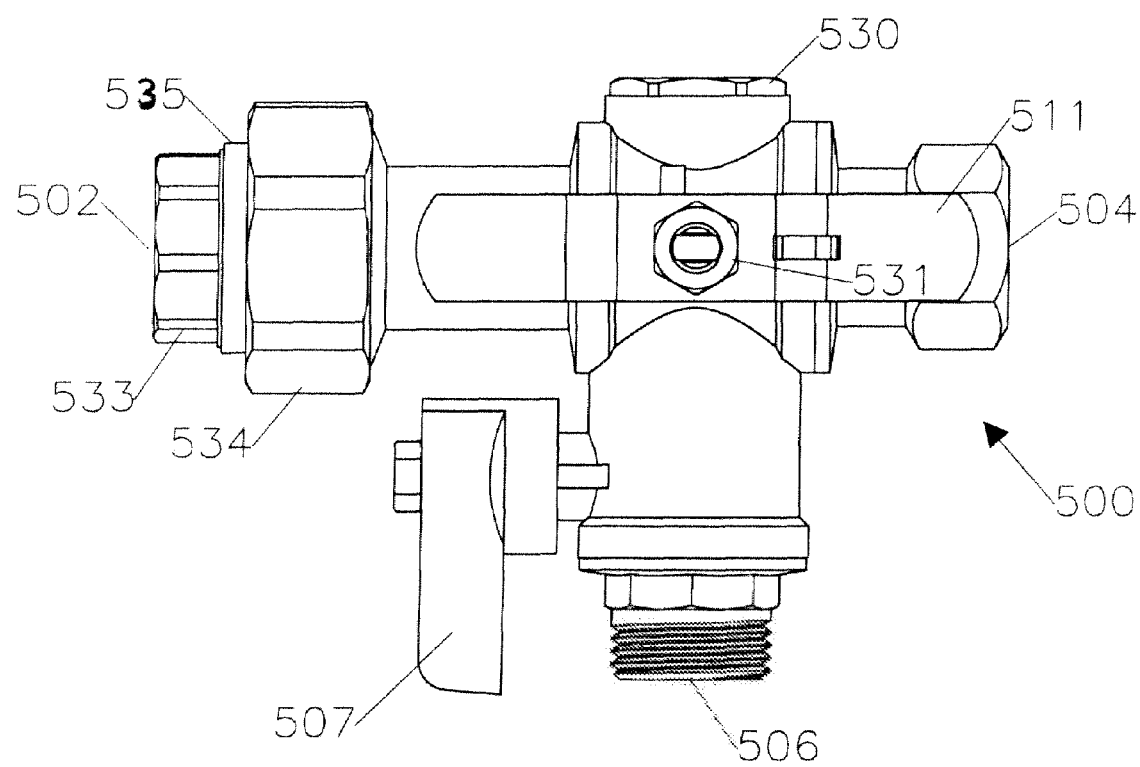
FIG. 5A is a complete plan view of a third embodiment of a cold water isolation valve according to the invention.

The cold water isolation valve 500 defines a cold water flow path 503 and a cold water drain path 505, illustrated in FIG. 5A1 and FIG. 5A2 respectively, wherein the cold water flow path 503 is disposed to communicate the first cold water port 502 with the second cold water port 504 and wherein the cold water drain path 505 is disposed to communicate the first cold water port 502 with the cold water drain port 506. The cold water isolation valve 500 also includes a flow diversion device, such as a ball valve 509, disposed within a valve portion 508. The ball valve 509 is actuated with a butterfly handle 511. It is contemplated within the scope of this invention that the ball valve 509 can be actuated with a single lever handle, set screw, circular handle or the like. The valve portion 508 is disposed between the first cold water port 502, second cold water port 504 and cold water drain port 506. Moreover, the flow diversion device is configurable between a first configuration, i.e. to open the cold water flow path 503, and a second configuration, i.e. to open the cold water drain path 505, via the ball valve 509.

Figure 5B:
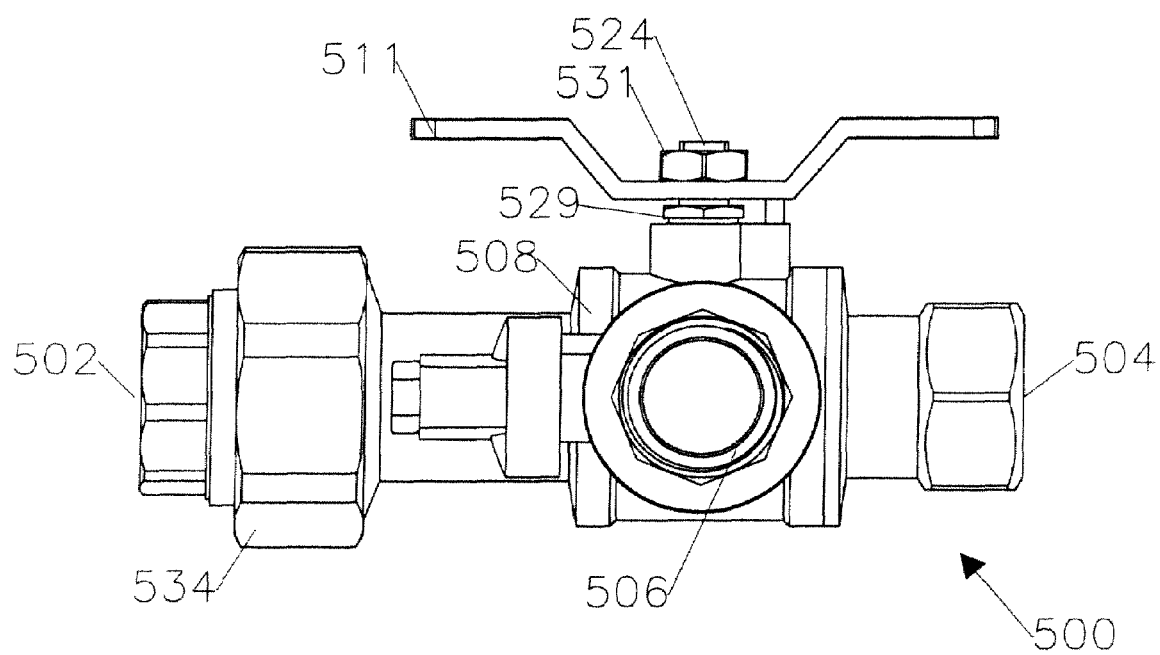
FIG. 5B is side plan view of the third embodiment of a cold water isolation valve according to the invention.

Turning to FIG. 5B and FIG. 5B1, a side plan view and a cut-a-way side view of the flow diversion device are shown. In a first configuration, the cold water flow is between the first cold water port 502 and second cold water port 504. The ball valve 509 has a second configuration wherein cold water flow is between the first cold water port 502 and cold water drain port 506. Advantageously, the drain port 506 may be fitted with the drain valve 501, which allows a operator of the valve 500 the ability to check flow within the second configuration while affixing a drainage or pumping device to the cold water drain port 506. The first cold water port 502 has a union connection 533 with a threaded portion (female) allowing for reliable sealing of the cold water isolation valve 500 within a plumbing system. The union connection 533 has a union nut 534 that sealably attaches the cold water isolation valve to the plumbing system with the use of a union washer 513. The union connection 533 further contains an insulator 535 formed of a polymeric material. The insulator 535 precludes galvanic action that might occur when a nipple or a pipe connecting to the valve 500 is iron or a metal dissimilar to the valve 500.

The second cold water port 504 has a threaded portion (female) allowing for threaded engagement to the plumbing system. It is contemplated within the scope of the invention that either cold water port 502, 504 can have a union connection or threaded connection. It is further contemplated within the scope of the invention that either cold water port 502, 504 can have other means of attachment known in the art such as threaded portion (male), a friction fit connector, a sweat connection, a crimped connector, a clamped connector, a quick disconnect connector, flange or the like.

According to the invention, the ball valve 509 allows for at least two configurations of fluid flow. A ball 520 forming the ball valve 509 is seated within the valve body with a first polymeric valve seat 522, a second polymeric valve seat 523, a third polymeric valve seat 527 and a fourth polymeric valve seat 528. It one illustrative embodiment the valve seats 522, 523, 527, 528 are formed of Teflon®. It is contemplated within the scope of the invention that any polymeric material having sufficient sealing qualities may be used. The ball valve 509 is positioned within the valve housing by way of a ball valve cap 530.

Affixed to the ball 520 is a valve stem 524. The valve stem 524 is sealably seated into the valve body with a polymeric valve stem seat 526 and a valve stem nut 529. Attached to the valve stem 524 is the butterfly handle 511 that is secured by the use of a handle nut 531. Within the ball 520 geometric channels allow for various flow diversions to and from the ports 502, 504 and cold water drain port 508.

Referring to FIGS. 6A, 6A1, 6A2, 6B, and 6B1, a hot water isolation valve 600 is shown and includes a first hot water port 602, a second hot water port 604, a hot water relief port 606 and a hot water drain port 608. The hot water drain port 608 is fitted with a drain port valve 601. The hot water isolation valve 600 defines a hot water flow channel 603 and a hot water drain channel 605. The hot water flow channel 603 provides fluid communication between the first hot water port 602 and the second hot water port 604. The hot water flow channel 603 is also open to the hot water relief port 606. The hot water drain channel 605 provides fluid communication between the first hot water port 602 and the hot water drain port 608 having a drain port valve 601. The hot water drain channel 605 is also open to the hot water relief port 606. The hot water isolation valve 600 includes a ball valve 609 as a flow diversion device, disposed within a valve portion 610 between first hot water port 602, second hot water port 604, hot water relief port 606 and hot water drain port 608 having the drain port valve 601. Moreover, the ball valve 609 is configurable between a first configuration and a second configuration via a handle 612. In a first configuration, the hot water flow is between first hot water port 602, second hot water port 604 and hot water relief port 606. In a second configuration the hot water flow is between first hot water port 602, hot water drain port 608 and hot water relief port 606.

Figure 6A:
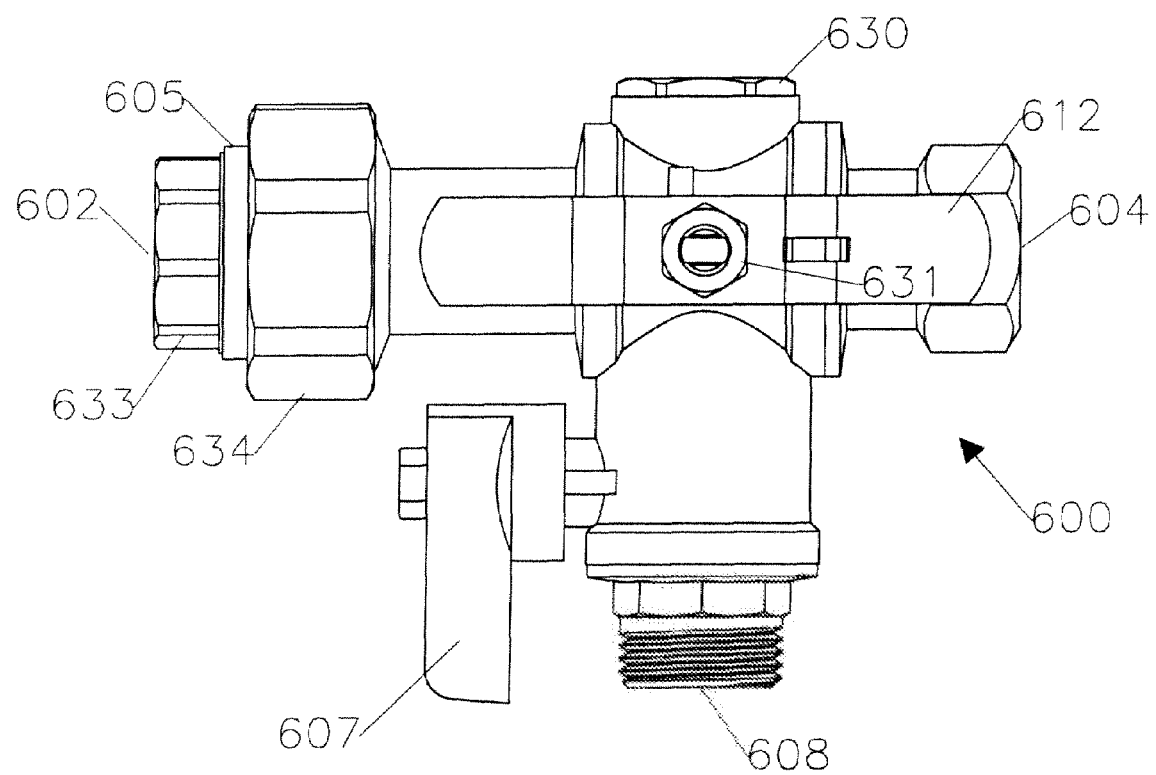
FIG. 6A is a complete plan view of a third embodiment of a hot water isolation valve according to the invention.
Figure 6B:
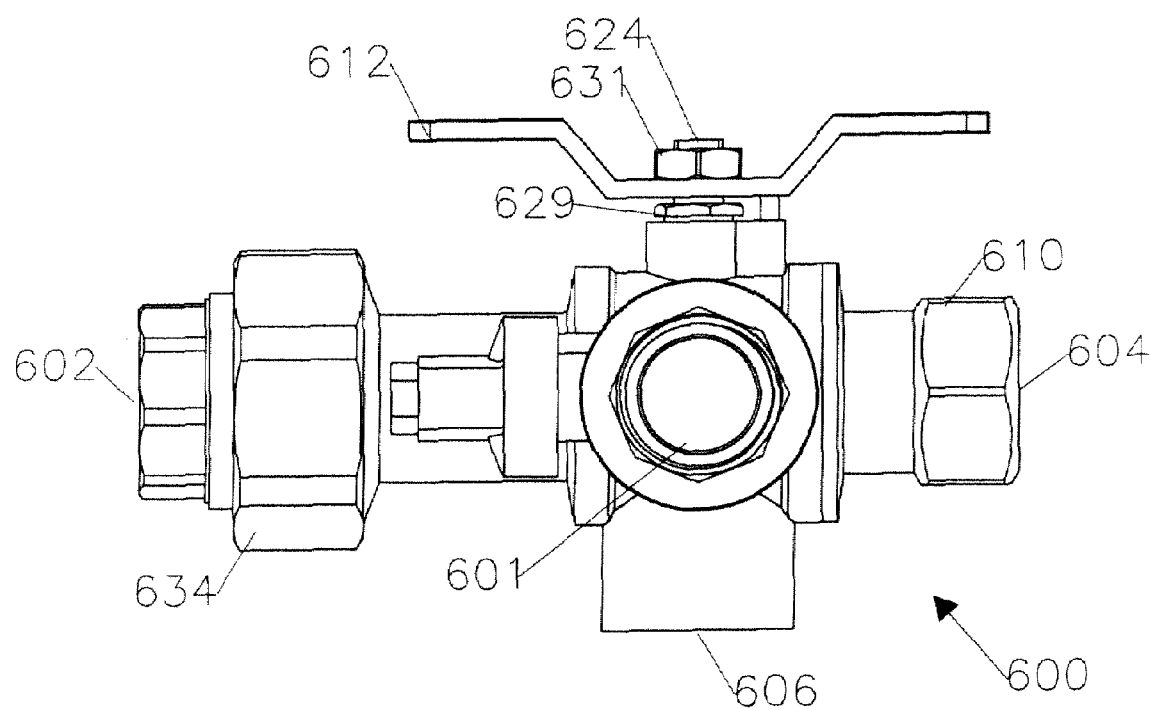
FIG. 6B is a side plan view of the third embodiment of a hot water isolation valve according to the invention.

Turning to FIG. 6B and 6B1, a side plan and a cut-a-way side view of the flow diversion device are shown. In a first configuration hot water flow is between first hot water port 602 and second hot water port 604. The flow diversion device, ball valve 609, has a second configuration wherein hot water flow is between first hot water port 602 and hot water drain port 608. Advantageously, the drain port 608 is fitted with the drain valve (not shown), which allows a user of the hot water isolation valve 600 the ability to check flow within the second configuration while affixing a drainage or pumping device to the hot water drain port 608.

The first hot water port 602 has a union connection 633 with a threaded portion (female) allowing for reliable sealing of the hot water isolation valve 600 within a plumbing system. The union connection 633 has a union nut 634 that sealably attaches the hot water isolation valve 600 to the plumbing system with the use of a union washer 613. The union connection 633 has an insulator 605 formed of a polymeric material. The insulator 605 precludes galvanic action that might occur when a nipple or a pipe connecting to the valve 600 is iron or a metal dissimilar to the valve 600.

The second hot water port 604 has a threaded portion (female) allowing for threaded engagement to the plumbing system. It is contemplated within the scope of the invention that either hot water port 602, 604 can have a union connection or threaded connection. It is further contemplated within the scope of the invention that either hot water port 602, 604 can have other means of attachment known in the art such as threaded portion (male), a friction fit connector, a crimped connector, a clamped connector, a quick disconnect connector, or the like.

According to the invention, the ball valve 609 allows for at least two configurations of fluid flow. A ball 620 forming the ball valve 609 is seated within the valve body with a first polymeric valve seat 622, a second polymeric valve seat 623, a third polymeric valve seat 627 and a fourth polymeric valve seat 628. In one illustrative embodiment the valve seats 622, 623, 627, 628 are formed of Teflon®. It is contemplated within the scope of the invention that any polymeric material having sufficient sealing qualities may be used. The ball valve 609 is positioned within the valve housing by way of a ball valve cap 630. Affixed to the ball 620 is a valve stem 624. The valve stem 624 is sealably seated into the valve body with a polymeric valve stem seat 626 and a valve stem nut 629. Within the ball 620 geometric channels allow for various flow diversions to and from the ports 602, 604 and hot water drain port 608.

Figure 7:
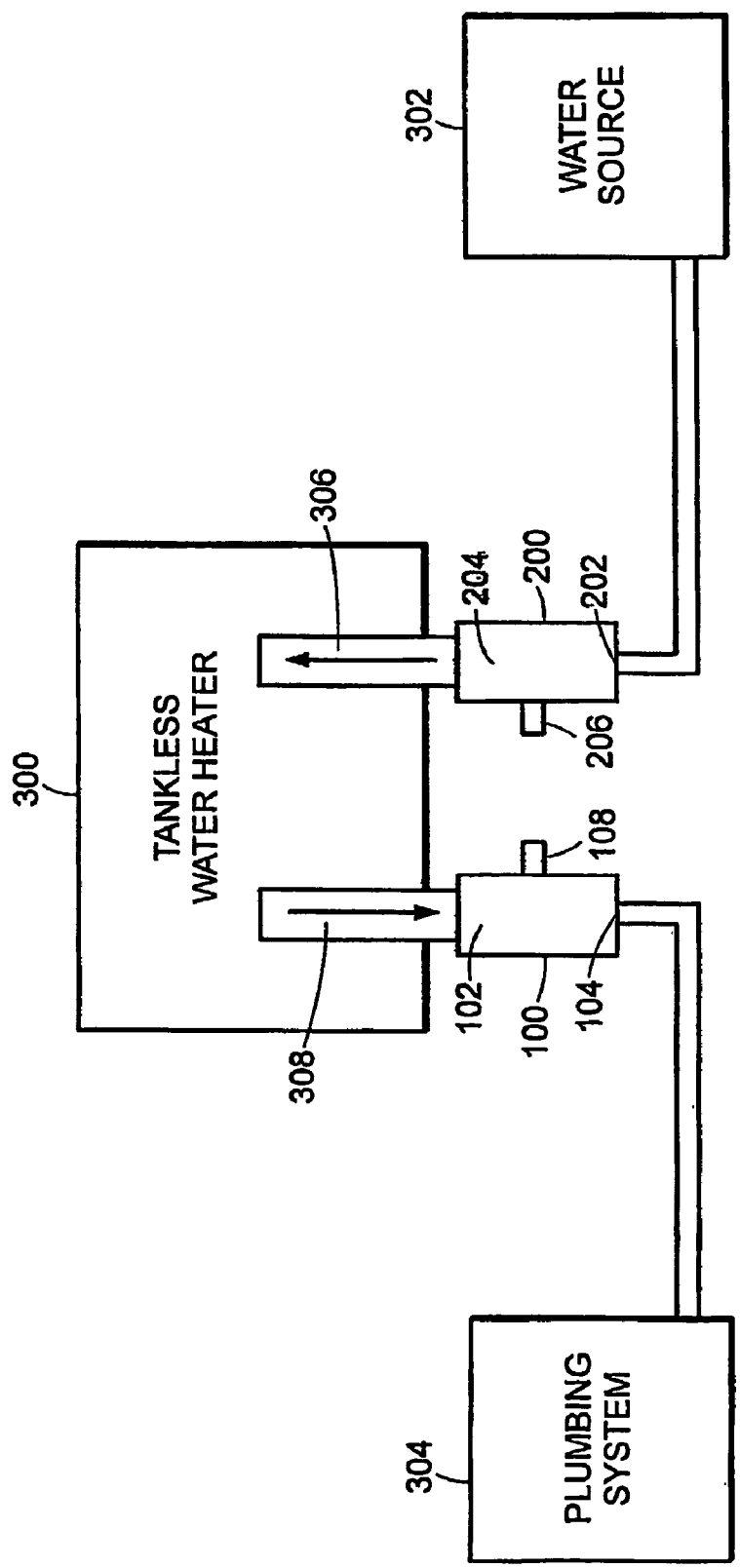
FIG. 7 is a diagrammatic representation of a tankless water heater disposed between a water source and a plumbing system.

Referring to FIG. 7, a typical in-line appliance set up is shown and includes a tankless water heater 300 connected between a water source 302 (such as a well or water main) and a plumbing system 304 (such as a plumbing system supplying a building), wherein tankless water heater 300 includes a first tankless water port 306 and a second tankless water port 308.

Referring to FIGS. 1-7, cold water isolation valve 200 is connected to water source 302 via first cold water port 202 and tankless water heater 300 via second cold water port 204 which is connected to first tankless water port 306. When the flow diversion device of cold water isolation valve 200 is in the first configuration, cold water is allowed to flow from water source 302, into first cold water port 202, through the cold water flow channel 201, out of second cold water port 204 and into first tankless water port 306. As discussed above, when the flow diversion device of cold water isolation valve 200 is in the second configuration, the flow path of cold water isolation valve 200 is between cold water drain port 206 and second cold water port 204 to facilitate draining the cold water side of the system. In the second position or configuration of the cold water isolation valve 200 the cold water is prevented from flowing into tankless water heater 300 via first cold water port 202. A cold water drain flow stop 212 (FIG. 3) or a drain valve 501 (FIG. 5A) may be provided for sealing off cold water drain port 206, thus completely preventing cold water from flowing through cold water isolation valve 200.

Hot water isolation valve 100, 600 is connected to tankless water heater 300 via second tankless water port 308 which is connected to first hot water port 102. Additionally, hot water isolation valve 100 is connected to plumbing system 304 via second hot water port 104. When the flow diversion device of hot water isolation valve 100 is in the first configuration, hot water is allowed to flow from second tankless water port 308, into first hot water port 102 through the hot water flow channel 101, out of second hot water port 104 and into plumbing system 304. When the flow diversion device of hot water isolation valve 100 is in the second configuration, hot water is allowed to flow from second tankless water port 308, into first hot water port 102 through the hot water drain channel 103 and out of hot water drain port 108 to facilitate draining the hot water side of the system (and emptying the tank). Water is likewise prevented from flowing into plumbing system 304. A hot water drain flow stop 114 (FIG. 1) or drain valve 601 (FIG. 6A) may be provided for sealing off hot water drain port 108, thus preventing water from flowing through hot water isolation valve 100.

This above described design advantageously allows for tankless water heater 300 and/or plumbing system 304 to be drained or flushed out. For example, when the flow diversion device of cold water isolation valve 200 is in the second configuration, a flushing device containing a flushing fluid, such as water or chemical solvent, may be connected to cold water drain port 206 to inject the flushing fluid into cold water drain port 206. The flushing fluid will flow through cold water drain channel 203, out of second cold water port 204, into first tankless water port 306 and through tankless water heater 300. The flushing fluid will then flow out of second tankless water port 308 and into first hot water port 102. If the flow diversion device of hot water isolation valve 100 is in the second configuration, the allowable flow path of the flushing fluid is between first hot water port 102 and hot water drain port 108, advantageously allowing tankless water heater 300 to be flushed. It should be appreciated that the above described flushing may also be performed in a reverse manner using hot water drain port 108 as an inlet flow port and cold water drain port 206 as an outlet flow port.

It is contemplated that one objective of this valve is to isolate the cold water feed and the hot water piping to a plumbing system so that the water heater can be replaced. These tankless on-demand water heaters typically mount onto a wall with fastening devices. To replace the unit, the valves can be shut off, the unions (e.g. first hot water port 102 and second cold water port 204) disconnected and the water heater removed from the wall. The drain ports having valves will be used to test the system and flush out the water heater with chemicals when the feed and hot water supply is shut off. The drain port valves allow an operator to control the flow of fluids at the within the stem of the drain port, which allows an operator greater convenience and safety. A pressure relief valve threaded into the hot water isolator valve will always be open to the water heater no matter what position the ball is in because the hole will be opposite the stem.

This innovative design will advantageously save space and time and offer a full fluid flow. The full fluid flow of the drain is important because the hot water heater is tested by fluid flow and temperature calculation. Moreover, space is also critical because these units are installed in small spaces. This design is less than half the length of current designs advantageously allowing these new isolation valves to be used in small spaces.

A cold water isolation valve and a hot water isolation value may be packaged together. Moreover, it should be appreciated that any size valve and configuration suitable to the desired end purpose may be used.

It should be appreciated that first hot water ports 102, 602 and first cold water ports 204, 502 are union connections, as is known in the art, for connecting hot water isolation valve 100 and cold water isolation valve 200 to tankless water heater 300.

Although an exemplary embodiment of hot water isolation valves 100, 600 and cold water isolation valves 200, 500 includes a forged brass construction, hot water isolation valves 100, 600 and cold water isolation valves 200, 500 may be constructed, in whole, in part or in combination, using any material suitable to the desired end purpose, such as cast brass, copper, iron, plastic and/or a composite material, such as polycarbonate. Moreover, although connections between hot water isolation values 100, 600, cold water isolation valves 200, 500 plumbing system 304 and tankless water heater 300 are shown as threaded screw type connections, it should be appreciated that these connections may be any connections suitable to the desired end purpose, such as friction fit connectors, crimped connectors, clamped connectors, quick disconnect connectors, or the like.

Although an exemplary embodiment of hot water isolation valves 100, 600 and cold water isolation valves 200, 500 show their use in connecting a tankless water heater to a plumbing system, it should be appreciated by those skilled in the art that the inventive isolation valves can be used to attach and isolate other plumbing appliances or plumbing systems known in the art within an overall plumbing system.

Although the invention has been shown and described with respect to exemplary embodiments thereof, various other changes, omissions and additions in the form and detail thereof may be made therein without departing from the spirit and scope of the invention.

What is claimed is:

1. A fluid isolation valve comprising:
    a valve body, said valve body having a first fluid flow port, a second fluid flow port and a fluid drain port, wherein said valve body defines a fluid flow channel, a drain flow channel and a valve portion, said valve portion being disposed to be communicated with said first fluid flow port, said second fluid flow port and said fluid drain port;
    a flow diversion device disposed within said valve portion, said flow diversion device configurable between a first configuration and a second configuration, when said flow diversion device is in said first configuration said first fluid flow port is communicated with said second fluid flow port and when said flow diversion device is in said second configuration said first fluid flow port is communicated with said fluid drain port; and
    a drain valve section separate from and adjacent to said valve portion, said drain valve section communicating with said fluid drain port in a controllable manner and said drain valve section having a drain port valve.

2. The fluid isolation valve according to claim 1, wherein said flow diversion device is a ball valve
    and said valve portion comprises a stem chamber and a ball chamber, said stem chamber disposed adjacent to and extending outwardly from said ball chamber;
    a stem disposed within and extending outwardly from said stem chamber and connected to a ball disposed within said ball chamber, an exposed portion of said stem extending beyond said stem chamber; and
    a handle connected to said exposed portion of said stem disposed within said stem chamber and connected to said ball, wherein actuation of said handle effects actuation of said ball for operating said ball valve unit.

3. The fluid isolation valve according to claim 2 wherein said ball valve unit has a first valve seat, a second valve seat, a third valve seat and a fourth valve seat wherein said valve seats sealably position said ball within said ball valve unit and said valve seats are made of a polymeric material.

4. The fluid isolation valve according to claim, 1 wherein said drain port valve is a ball valve.

5. The fluid isolation valve according to claim 1, wherein said first fluid flow port is fitted with a union connection and said second fluid flow port is fitted with a threaded connection.

\* \* \* \* \*